United States Patent [19]
Song et al.
[11] 4,085,045
[45] Apr. 18, 1978

[54] LOW MOLECULAR WEIGHT HYDROLYZED POLYACRYLAMIDE USED AS A SCALE INHIBITOR IN WATER SYSTEMS

[75] Inventors: Dae Suk Song, Wyckoff, N.J.; Richard Joseph Duffy, Greenwich, Conn.; Charles Richard Witschonke, Noroton, Conn.; Arthur Maurice Schiller, Stamford, Conn.; Mark Allan Higgins, Guilford, Conn.

[73] Assignee: American Cyanamid Company, Stamford, Conn.

[21] Appl. No.: 750,488

[22] Filed: Dec. 14, 1976

Related U.S. Application Data

[62] Division of Ser. No. 586,765, Jun. 13, 1975, Pat. No. 4,001,161.

[51] Int. Cl.[2] .......... C02B 5/06
[52] U.S. Cl. .......... 210/58; 252/180
[58] Field of Search .......... 210/54, 58; 252/180, 252/181; 260/29.6 H, 29.6 Z, 29.6 AT; 526/23

[56] References Cited

U.S. PATENT DOCUMENTS

| | | | |
|---|---|---|---|
| 2,820,777 | 1/1958 | Sven et al. | 526/23 |
| 3,247,171 | 4/1966 | Walker et al. | 526/23 |
| 3,380,947 | 4/1968 | Galgoczi | 260/29.6 Z |
| 3,463,730 | 8/1969 | Booth et al. | 210/58 |
| 3,589,998 | 6/1971 | Rice et al. | 210/58 |
| 3,756,257 | 9/1973 | Rice et al. | 210/58 |
| 3,846,390 | 11/1974 | Ito et al. | 526/214 |
| 4,008,164 | 2/1977 | Watson et al. | 210/58 |

OTHER PUBLICATIONS

Bovey et al., Emulsion Polymerization, Interscience, N.Y., 1955, pp. 278 & 279.

*Primary Examiner*—Charles N. Hart
*Assistant Examiner*—Peter A. Hruskoci
*Attorney, Agent, or Firm*—John L. Sullivan

[57] ABSTRACT

A process for inhibiting scale formation using a low molecular weight hydrolyzed polyacrylamide prepared by a process involving simultaneously and continuously charging separate streams of acrylamide monomer, ammonium persulfate (as catalyst) and mercaptoalkanoic acid (as chain transfer agent) to a reaction zone containing water under reflux, the rate of charging being such that the heat of polymerization is sufficient to maintain reflux in the reaction zone without exceeding the capacity of the condenser to remove the heat of reaction, and then reacting the polymer product with sufficient aqueous caustic to hydrolyze from about 60 to 90% of the amide groups in the polymer product.

2 Claims, No Drawings

LOW MOLECULAR WEIGHT HYDROLYZED POLYACRYLAMIDE USED AS A SCALE INHIBITOR IN WATER SYSTEMS

This is a division of application Ser. No. 586,765 filed June 13, 1975, now U.S. Pat. No. 4,001,161, issued Jan. 4, 1977.

This invention relates to a low molecular weight partially hydrolyzed polyacrylamide, used as an anti-precipitant and/or scale inhibitor in water systems containing scale-forming salts, principally the carbonates, sulfates and silicates of calcium, magnesium and iron. In water systems such as boilers, cooling towers, scrubbers and the like these compounds tend to precipitate out of the water and adhere to the metal surfaces as scale. The build up of scale in the systems interferes with fluid flow, prevents effective heat transfer and facilitates corrosive processes thereby necessitating shutdowns for cleaning and removal. The problem of scale formation is a very serious one since once the scale is formed it is difficult to remove. In combating the problem, it has been the established practice to treat scaling systems, such as boilers, evaporators, heat exchangers, etc., with small amounts, from about 1 to about 100 parts per million, of chemical agents, effective as antiprecipitants, sequestrants and chelating agents. More recently, it has been found that low molecular weight acrylic polymers, such as a polymer of acrylic acid or a partially hydrolyzed acrylamide polymer are highly effective for the treatment of scale-forming systems. Thus, they inhibit the precipitation of hard water ions, such as calcium and magnesium, in such systems. They also modify the scale which does form in such systems so that it is non-adherent to the metal surfaces and thus easier to remove than the hard scale formed when the polymers are not used.

It is, of course, well known that the polymers which are effective anti-precipitants and de-scalants are of relatively low molecular weight, i.e., below about 40,000 and preferably below about 10,000. Thus, polymers of high molecular weight, from about 40,000 to several million, do not act as anti-precipitants but as flocculants, a diametrically opposite effect.

A highly effective commercial polymer, for example, is the hydrolyzed acrylamide polymer of about 6000 molecular weight having about 15% unhydrolyzed amide groups. The polymer is made by polymerizing acrylamide with a redox catalyst, as follows: A solution is prepared from 50 parts of acrylamide and 158 parts of deionized water. To this solution, is added, with stirring, 2.5 parts sodium metabisulfite and 0.75 parts ammonium persulfate. The reaction proceeds, as evidenced by an exotherm carrying the temperature to 95°-99° C. The reaction mixture is maintained, after the exotherm, at 95°-99° C. for 1 hour. After cooling to 80° C., 56.3 parts of 50% sodium hydroxide solution is added and the mixture maintained at 80°-85° C. for 1 hour. The product is then drum-dried to give a flaky powder. It is identified hereinafter as Polymer A.

In accordance with the present invention, it has now been found that a hydrolyzed polymer of superior effectiveness to Polymer A as an antiprecipitant and anti-scale agent is produced by conducting the polymerization of the acrylamide in a specified fashion different from that heretofore used for the preparation of acrylamide polymers, such as Polymer A. Thus, it has been found that a polymer having a very low average molecular weight, i.e., about 500-5000 and a very narrow molecular weight distribution is provided by conducting the polymerization in a semi-continuous manner under reflux conditions in the presence of ammonium persulfate as catalyst and a mercaptoalkanoic acid, such as thioglycolic acid, mercaptopropionic acid or thiomalic acid, as chain transfer agent. Thus, the reaction is carried out in water solution by charging separate streams of acrylamide, catalyst and transfer agent continuously and simultaneously to a reactor containing a heel of water heated at reflux. Polymerization occurs spontaneously upon introduction of the streams and the rates of addition are governed by the capacity of the reflux condenser to remove the heat of polymerization and are controlled so that the introduction of all three streams will start and finish together. All condensate is returned to the reactor. The heat of polymerization is more than sufficient to maintain reflux until the very last stages of addition. At that point steam may be required in the reactor jacket. The amount of ammonium persulfate catalyst used is from about 0.05% to about 2% based on the weight of the acrylamide monomer used while the amount of mercaptoalkanoic acid is from about 5% to about 20% on the same basis.

When the addition of the three streams is complete, the batch is ready for hydrolysis which is effected at reflux by addition of a 50% solution of sodium hydroxide in sufficient amount to hydrolyze approximately 85% of the amide groups in the polymer to sodium carboxylate groups. A specific preparation of the polymer of the invention is shown in the following example in which all parts are by weight.

EXAMPLE 1

287 parts of de-ionized water are charged to a reactor equipped with a reflux condenser and the water is heated to reflux temperature.

In a separate vessel equipped with an agitator, there is charged 149 parts of de-ionized water and 472 parts of acrylamide pellets with the temperature being held to 50° C. to completely dissolve the acrylamide. To prevent premature polymerization an air sparge is applied to the solution, hereinafter referred to as Solution I.

A second separate solution of 4.3 parts of ammonium persulfate in 98.4 parts of de-ionized water is also prepared. This solution is referred to as Solution II.

To the reactor containing the heel of water at reflux is then added simultaneously separate streams of Solutions I and II and a third stream (III) consisting of 59.7 parts of thioglycolic acid, the three streams being metered into the reactor at rates such that the introduction of all three starts and finishes together. Thus, the rate for stream I is approximately 10 times that of stream III while that of stream II is about 1.7 times that of stream III. When the addition of the three streams is completed, steam is applied to the reactor jacket and hydrolysis is effected under reflux by addition of 582 parts of a 50% solution of sodium hydroxide at about 15 parts per minute. When the caustic addition is complete, the batch is held at reflux for a period of 4 hours at which point the carboxyl content of the polymer product is approximately 85%. The polymer product, which is then drum-dried, has an average molecular weight of 2000-3000.

The superiority of the hydrolyzed polyacrylamide product prepared as in Example 1 over the Polymer A as an antiprecipitant and anti-scale agent is shown in the following comparative tests.

(1) Boiler Sludge Conditioning: To a test boiler, operating at 400 psig and 10 cycles of concentration, was fed in separate runs as sludge conditioner for calcium phosphate formed, 2 ppm of the polymer prepared in Example 1 and 2 ppm of Polymer A, respectively, and the amount of scale deposit formed, relative to a blank run determined. The results were as follows:

| | % Scale Reduction |
|---|---|
| Product of Ex. 1 | 87.9 |
| Polymer A | 58.3 |

(2) Calcium Sulfate Antiprecipitation: Solutions of calcium chloride and sodium sulfate were mixed in the presence of added treatment. The resulting solution contained the equivalent of 10500 ppm of calcium sulfate. The tests were conducted, with stirring, for 24 hours at 50° C. and the calcium sulfate retained in solution was determined by titration for calcium after filtering.

| | Dosage Required for 100% Inhibition of Precipitation - ppm - solids |
|---|---|
| Product of Ex. 1 | 15 |
| Polymer A | 26 |

(3) Calcium Carbonate Antiscalant Action: In a water containing 300 ppm, as calcium carbonate, hardness and 275 ppm, as calcium carbonate, alkalinity, flowing over a hot copper coupon, 3 ppm of the Polymer of Example 1 prevented scaling. In the same setup, 6 ppm of Polymer A was required.

Similar superior results are obtained with hydrolyzed acrylamide polymers prepared by the process of the invention having from about 60 to about 90% of the amide groups thereof hydrolyzed to sodium carboxylate groups.

The amount of the hydrolyzed polymer of the invention which need be added to a water system for effective antiprecipitant and/or anti-scaling action will vary from about 1 to about 100 ppm depending upon the hardness of the water and the severity of the conditions which cause precipitation and formation of scale in a particular system. Since the polymers of the invention are water-soluble, they may be added to the water system dry or in a water solution where liquid feeding is more convenient.

We claim:

1. A process for inhibiting scale formation in a water system containing scale-forming salts comprising adding to said system from about 1 to about 100 parts per million of a hydrolyzed polyacrylamide having a molecular weight of 500–5000 and which is prepared by the process which comprises (1) charging to a reaction zone, equipped with a reflux condenser and containing water heated to reflux as the polymerization medium, simultaneously and continuously without external heating, separate streams of acrylamide, ammonium persulfate and a mercaptoalkanoic acid, the amounts by weight of ammonium persulfate and mercaptoalkanoic acid so charged being from about 0.05 to about 2 parts and from about 5 to about 20 parts, respectively, per 100 parts of acrylamide charged and the charging rates of the separate streams being controlled so that the introduction of all three streams starts and finishes substantially together and the heat of polymerization is sufficient to maintain reflux in the reaction zone without exceeding the capacity of the condenser to remove the heat of reaction, (2) applying heat to the reaction zone to maintain the refluxing towards the end of the addition of the three streams and (3) charging a sufficient amount of aqueous sodium hydroxide to hydrolyze from about 60% to about 90% of the amide groups of the polymer to carboxylate groups and provide a water solution of the hydrolyzed polymer product.

2. A process of claim 1 wherein the hydrolyzed polyacrylamide has about 85% carboxylate groups and 15% amide groups and an average molecular weight of 2000–3000.

* * * * *